(12) United States Patent
Andres

(10) Patent No.: US 7,987,683 B2
(45) Date of Patent: Aug. 2, 2011

(54) EXPENDABLE TURBINE DRIVEN COMPRESSION CYCLE COOLING SYSTEM

(75) Inventor: Michael J. Andres, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1396 days.

(21) Appl. No.: 11/358,791

(22) Filed: Feb. 20, 2006

(65) Prior Publication Data

US 2007/0193301 A1    Aug. 23, 2007

(51) Int. Cl.
*F25D 9/00* (2006.01)

(52) U.S. Cl. ............................................. 62/402; 62/498

(58) Field of Classification Search ................... 62/402, 62/498, 500

See application file for complete search history.

(56) References Cited

U.S. PATENT DOCUMENTS

| 4,896,515 | A | * | 1/1990 | Endou | ............................ 62/498 |
| 4,984,432 | A | * | 1/1991 | Corey | ............................ 62/87 |

* cited by examiner

*Primary Examiner* — Melvin Jones
(74) *Attorney, Agent, or Firm* — Stephen G. Mican

(57) ABSTRACT

A cooling system with a compression cooling cycle for a working fluid that passes an expendable fluid through a warm side heat exchanger for the cooling system to cause the expendable fluid to vaporise and thus absorb heat from the working fluid by way of latent heat or enthalpy of vaporisation and then running the vaporised expendable through a turbine that drives a compressor for the cooling system.

21 Claims, 4 Drawing Sheets

EXPENDABLE TURBINE DRIVEN COMPRESSION CYCLE COOLING SYSTEM

FIELD OF THE INVENTION

The invention generally relates to compression cycle cooling systems, and more particularly to both vapour and air cycle cooling systems that utilise an expendable fluid to assist the cooling system cycle.

BACKGROUND OF THE INVENTION

Some proposed high energy applications, such as high energy lasers and high speed long-range aircraft, have large cooling requirements with limited available electric or mechanical shaft power and limited available heat sinking for conventional vapour and air compression cycle cooling systems. High-energy laser systems have relatively low efficiencies that cause waste heat to be approximately ten or more times their beam energy. At the same time, they only operate effectively within stringent temperature ranges. High-speed long-range aircraft have large engine and airframe heat loads during the major portions of their flights, thereby consuming the normal capacity of any available fuel heat sink whilst their high speed makes any available ram air heat sink less suitable due to increasing temperatures and drag with increasing speed.

Some cooling systems have used the latent heat or enthalpy of vaporisation for a boiling liquid expendable to assist heat extraction. However, such systems have only been suitable for short-term heat loads, such as during supersonic dash flights.

SUMMARY OF THE INVENTION

The invention comprises a cooling system with a compression cooling cycle for a working fluid, either vapour or air, that passes an expendable fluid through a warm side heat exchanger for the cooling system to cause the expendable fluid to vaporise and thus absorb heat from the working fluid by way of latent heat or enthalpy of vaporisation and then running the vaporised expendable through a turbine that drives a compressor for the cooling system. In this way, the cooling system needs less electric or mechanical power for driving its compressor.

Generally, the invention comprises a cooling system that uses a compression cycle for cooling a working fluid, comprising: a cool side heat exchanger for transferring heat $Q_L$ from a heat load to the working fluid that heats the working fluid; a compressor driven by a prime mover that receives the heated working fluid and compresses it to a high pressure; a warm side heat exchanger that receives the heated high-pressure working fluid from the compressor and cools it with an expendable liquid that receives heat from the heated high pressure working fluid and vaporises it to produce a pressurised expendable gas; and a turbine powered by the pressurised expendable gas that assists the prime mover to drive the compressor.

DETAILED DESCRIPTION OF THE INVENTION

Figure 1:
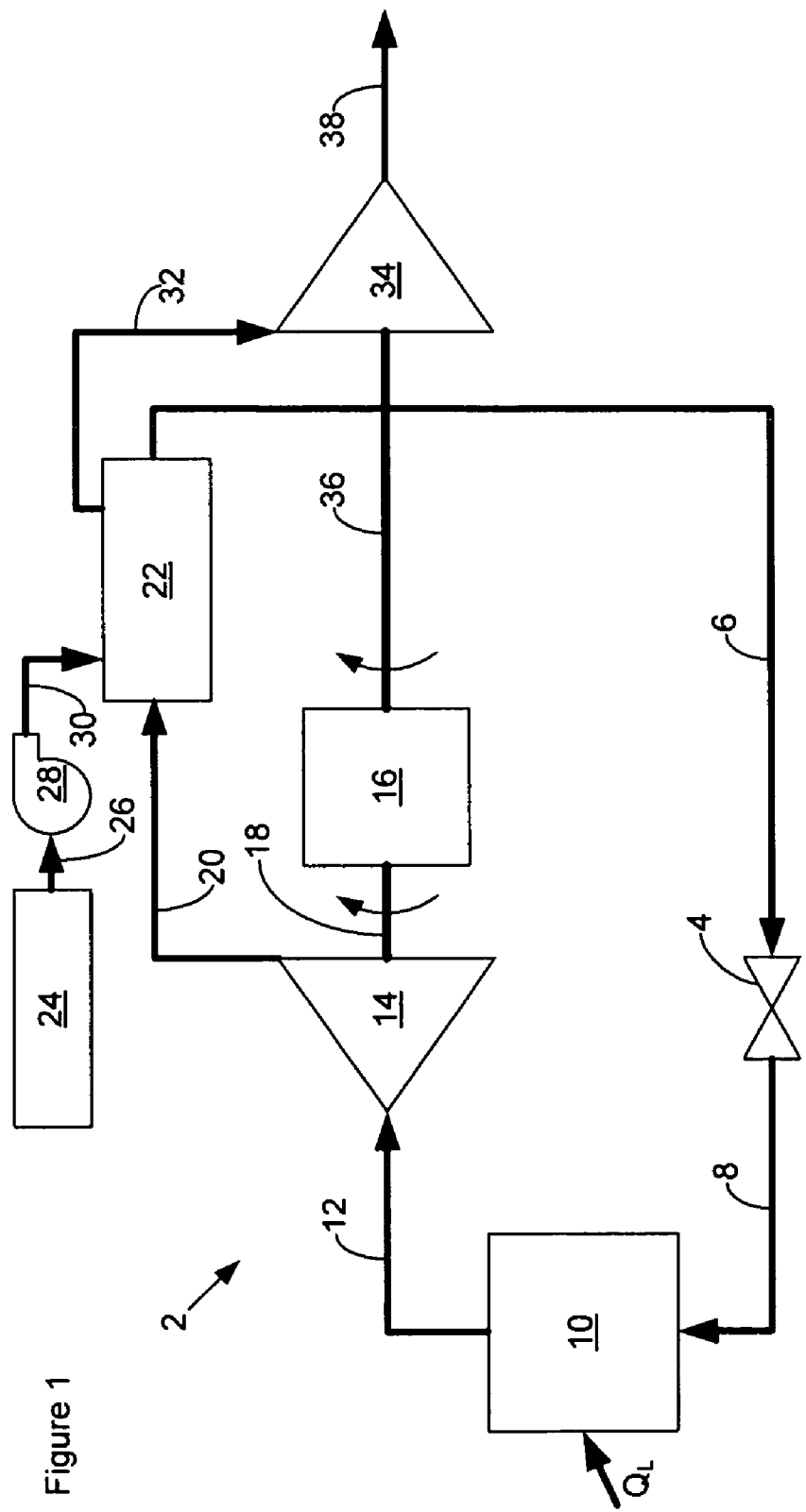
FIG. 1 is a schematic of an expendable turbine driven vapour compression cycle cooling system according to a possible embodiment of the invention.

FIG. 1 is a schematic of an expendable turbine driven vapour compression cycle cooling system 2 according to a possible embodiment of the invention. An expansion valve 4 receives high-pressure working fluid in a liquid state from a high-pressure working fluid supply path 6. The working fluid may comprise any desirable working fluid that has a suitable latent heat or enthalpy of vaporisation and boiling point within a reasonable pressure range for a target application. The expansion valve 4 restricts flow of the liquid working fluid from the high-pressure working fluid supply path 6 into an expansion valve output path 8, thereby reducing pressure of the working fluid in the expansion valve output path 8.

A-low temperature or cool side heat exchanger 10 receives the low-pressure working fluid from the expansion valve output path 8. It also transfers heat $Q_L$ from a heat load to the low-pressure working fluid and serves as an evaporator that causes the working fluid to rise in temperature to its boiling point and absorb even more heat from the heat load due to its enthalpy of vaporisation as it changes state to a vapour. The evaporating heat exchanger or evaporator 10 then discharges the low-pressure heated working fluid in its vapour state into low temperature heat exchanger output path 12.

A compressor 14, driven by a prime mover 16 through a compressor drive shaft 18, receives the low-pressure heated working fluid from the low temperature heat exchanger output path 12, compresses it to a high pressure and discharges the high-pressure heated working fluid into a compressor output path 20. The prime mover 16 may be any suitable machine, such as a dynamoelectric machine of the electric motor or motor/generator type, a hydraulic motor, an output shaft from a vehicle propulsion engine or a turbine driven by an available fluid, such as bleed air from the compressor of a gas turbine engine.

A special warm side heat exchanger 22 according to the invention receives the high-pressure heated working fluid from the compressor output path 20 and cools it with a liquid expendable fluid. The expendable may be any convenient fluid that is storable in liquid state that has a suitable latent heat or enthalpy of vaporisation and boiling point within a reasonable pressure range for the purpose. Typical expendables that may be suitable for normal applications are propane and butane. Other expendables may be suitable for operating the heat exchanger 22 at temperature extremes, such as heavier hydrocarbons at elevated temperatures or even hydrogen at very low temperatures.

The heat exchanger 22 itself may store a quantity of expendable, or the expendable may have external storage. FIG. 1 shows an expendable tank 24 for storing expendable. The expendable tank 24 discharges expendable into an expendable tank output path 26. An expendable feed pump 28 receives the expendable from the expendable tank output path and discharges it into an expendable feed pump output path 30. The feed pump 28 may couple to the prime mover 16 or it may have its own separate source of motive power. The heat exchanger 22 then receives the expendable from the expendable feed pump output path 30.

The separate expendable tank 24 and pump 28 may be more suitable for applications that require a longer operation where a larger tank would not be required to withstand turbine inlet pressure and the pump 28 is not a large part of the overall system. The separate expendable tank 24 may also be more suitable for a low or zero g application where the expendable tank 24 is of an accumulator or bladder type and usable in combination with a zero g tolerant heat exchanger 22.

The expendable absorbs heat from the heated high-pressure working fluid in the heat exchanger 22, and the heat exchanger 22 serves as a condenser that cools the high-pressure working fluid to below its boiling point at the high pressure and changes its state back into a high-pressure liquid. The condensing heat exchanger or condenser 22 then discharges the cooled high-pressure working fluid into the high-pressure working fluid supply path 6, thereby completing the cycle. At the same time, the high-pressure working fluid transfers heat to the expendable within the heat exchanger 22, thereby changing its state from a liquid to a pressurised gas. The heat exchanger 22 therefore serves as a boiler for the expendable. The latent heat or enthalpy of vaporisation for the expendable allows the heat exchanger 22 to provide a significant heat transfer with minimal size and weight. The heat exchanger 22 then discharges the pressurised expendable vapour into an expendable vapour output path 32.

A turbine 34 receives the pressurised expendable vapour from the expendable turbine vapour output path 32 and drives the compressor 14, along with the prime mover 16, through a turbine drive shaft 36. The turbine 34 expands the pressurised expendable vapour, thereby increasing its velocity and lowering its pressure, and discharges the high velocity low-pressure expendable vapour into a turbine output path 38.

Vaporising the expendable in the heat exchanger 22 maximises the degree of heat sinking that it can perform whilst driving the turbine 34 with the vaporised expendable assists driving the compressor 14 to minimise the electrical or mechanical shaft power required by the prime mover 16. Thus, the cooling system 2 according to this possible embodiment of the invention provides greater cooling capacity with less input power than heretofore available systems.

Figure 2:
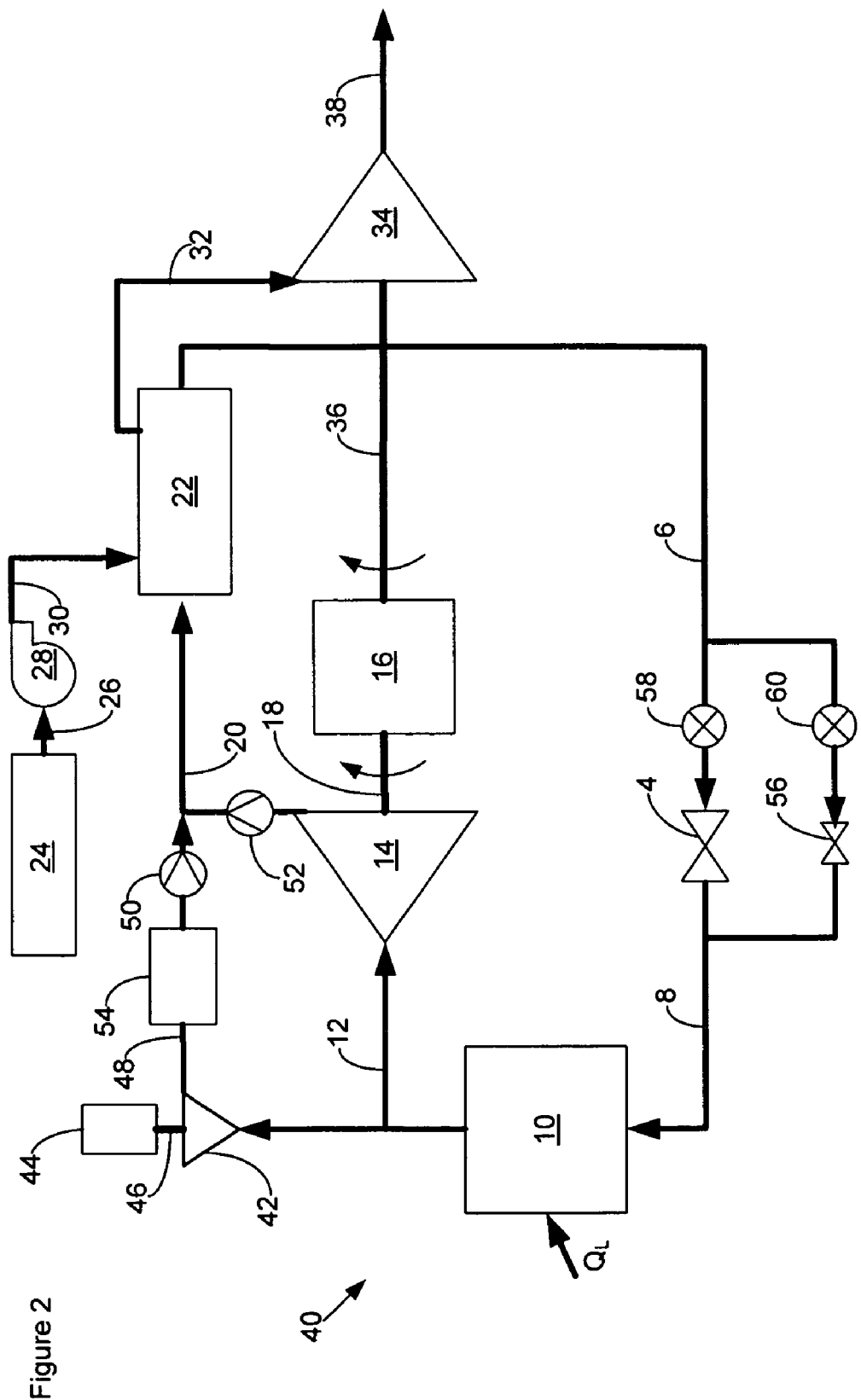
FIG. 2 is a schematic of an expendable turbine driven vapour compression cycle cooling system with a provision for standby operation according to a possible embodiment of the invention.

Some applications may require a low power standby operation, such as the beam-off operation of the hereinbefore-described high-energy lasers. FIG. 2 is a schematic of an expendable turbine driven vapour compression cycle cooling system 40 with a provision for standby operation according to a possible embodiment of the invention. It is similar in basic operation to the cooling system 2 hereinbefore described in connection with FIG. 1. However, it further comprises a small flow capacity standby compressor 42, driven by a small standby prime mover 44 through a standby compressor drive shaft 46, that also receives the low-pressure heated working fluid from the evaporator output path 12. During standby operation, the prime mover 16 shuts down and the standby prime mover 44 starts up. The standby compressor 42 compresses a sufficient volume of low-pressure heated working fluid from the low temperature heat exchanger output path 12 for standby operation to a high pressure and discharges the high-pressure heated working fluid into a standby compressor output path 48. The high-pressure heated working fluid in the compressor output path 48 feeds into the compressor output path 20.

FIG. 2 shows a standby compressor flow control valve 50 in the standby compressor output path 48 to prevent flow of high-pressure heated working fluid from the compressor 14 back into the standby compressor 42 during normal operation and a compressor flow control valve 52 in the compressor output path 20 to prevent flow of high pressure heated working fluid from the standby compressor 42 back into the compressor 14 during standby operation. The flow control valves 50 and 52 may be check valves as shown in FIG. 2 or other means for preventing backflow, such as sequentially operated shut-off valves.

If it is undesirable to consume expendable during standby operation, an optional small standby heat exchanger or condenser 54 in the standby compressor output path 48 upstream of the may provide suitable cooling for the high-pressure heated working fluid supplied by the standby compressor instead. In this case, ram air, fuel or other available heat sink may cool the optional standby heat exchanger or condenser 54.

A small flow capacity standby expansion valve 56 receives the cooled high-pressure working fluid from the high-pressure working fluid supply path 6 during standby operation and discharges high-velocity low-pressure working fluid into the expansion valve output path. The capacity of the standby expansion valve is suitable for the smaller volume of cooled high-pressure working fluid supplied by the high-pressure working fluid supply path 6 during standby operation.

FIG. 2 shows expansion valve flow control valve 58 and standby expansion valve flow control valve 60 in the high-pressure working fluid supply path 6 upstream of the expansion valve 4 and the standby expansion valve 56, respectively. The flow control valves 58 and 60 direct the flow of cooled high-pressure working fluid through the expansion valve 4 during normal operation and through the standby expansion valve during standby operation. The flow control valves 58 and 60 may be sequentially operated shut-off valves as shown in FIG. 2 or other means for directing flow between the expansion valve 4 and the standby expansion valve 56, such as a single two-way valve.

The flow valves 58 and 60 are expendable if the expansion valve 4 and standby expansion valve 56 are thermostatic expansion valves with different selected superheat valves such that the standby expansion valve 56 has a lower superheat setting than the expansion valve 4. The flow valves 58 and 60 are also expendable if the expansion valve 4 and the standby expansion valve 56 are proportional valves controlled electronically to serve as expansion valves.

Figure 3:
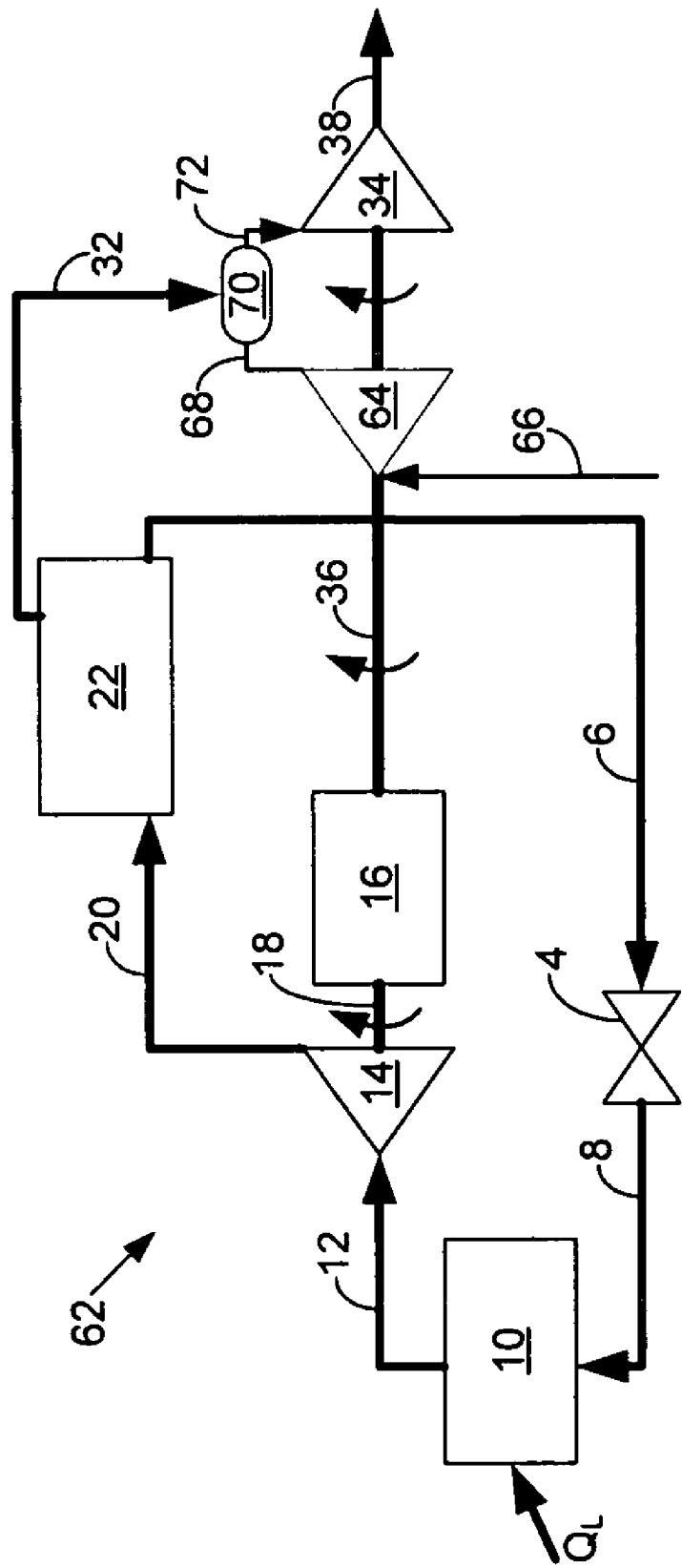
FIG. 3 is a schematic of a combusted expendable turbine driven vapour compression cycle cooling system according to a possible embodiment of the invention.

In some applications, it may be desirable to combust the expendable with air to provide additional power for the turbine 34, thereby lowering power requirements for the prime mover 16 still further. FIG. 3 is a schematic of a combusted expendable turbine driven vapour compression cycle cooling system 62 according to a possible embodiment of the invention. It is similar in basic operation to the cooling system 2 hereinbefore described in connection with FIG. 1. However, it further comprises an air compressor 64 driven by the turbine drive shaft 36 that receives air from an air supply path 66, pressurises it and discharges it into a compressed air path 68. By way of example only, it shows an arrangement wherein the heat exchanger 22 itself may store a quantity of expendable, as hereinbefore described, thus eliminating the need for the expendable tank 24 and expendable feed pump 28. Of course, this embodiment may alternately comprise external storage of expendable with the expendable tank 24 and the expendable feed pump 28 if desired.

A combustor 70 receives the compressed air from the compressed air path 68 and pressurised expendable vapour from the expendable vapour output path 32, combusts the expendable vapour with the compressed air and discharges high-pressure combustion gas into a combustor discharge path 72. The turbine 34 receives the high-pressure combustion gas from the combustor discharge path 72 and drives the air compressor 64 and the compressor 14 through the drive shaft 36. The turbine 34 expands the pressurised combustion gas, thereby increasing its velocity and lowering its pressure, and discharges the high velocity low-pressure combustion gas into a turbine output path 38.

Figure 4:
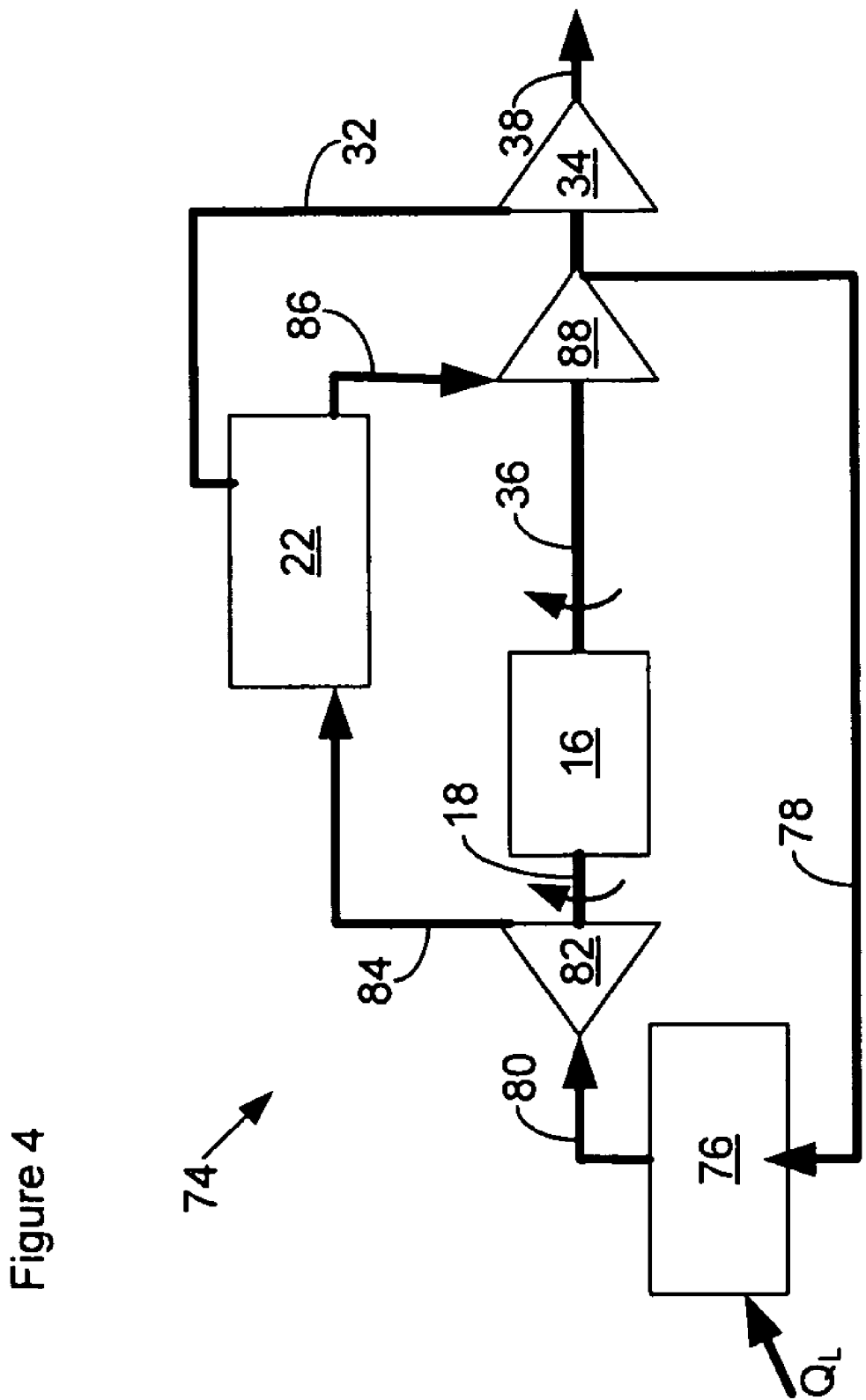
FIG. 4 is a schematic of an expendable turbine driven air compression cycle cooling system according to a possible embodiment of the invention.

For some applications, it may be desirable to use a cooling system with an air compression cycle rather than a vapour compression cycle. FIG. 4 is a schematic of an expendable turbine driven air compression cycle cooling system 74 according to a possible embodiment of the invention. As with the possible embodiment hereinbefore described in connection with FIG. 3, and by way of example only, it shows an arrangement wherein the heat exchanger 22 itself may store a quantity of expendable, as hereinbefore described, thus eliminating the need for the expendable tank 24 and expendable feed pump 28. Of course, this embodiment may alternately comprise external storage of expendable with the expendable tank 24 and the expendable feed pump 28 if desired. A low-pressure air or cool side heat exchanger 76 receives low-pressure air from a low-pressure air supply path 78 and transfers heat $Q_L$ from a heat load to the low-pressure air. The heat exchanger 76 then discharges the heated low-pressure air into a low-pressure heat exchanger output path 80.

An air compressor 82, driven by the prime mover 16 through the compressor drive shaft 18 as hereinbefore described in connection with the other embodiments, compresses the heated low-pressure air to a high pressure and discharges the heated high-pressure air into an air compressor output path 84. The high temperature or warm side heat exchanger 22 receives the heated high-pressure air from the air compressor output path 84 and cools it with the liquid expendable fluid. The expendable absorbs heat from the heated high-pressure air in the heat exchanger 22, thereby cooling the high-pressure air. The heat exchanger 22 then discharges the cooled high-pressure air into a high temperature heat exchanger output path 86. At the same time, the heated high-pressure air transfers heat to the expendable within the heat exchanger 22, thereby changing its state from a liquid to a pressurised gas. The heat exchanger 22 therefore serves as a boiler for the expendable. The latent heat or enthalpy of vaporisation for the expendable allows the exchanger 22 to provide a significant heat transfer with minimal size and weight. The heat exchanger 22 then discharges the pressurised expendable vapour into the expendable vapour output path 32.

The turbine 34 receives the pressurised expendable vapour from the expendable vapour output path 32 and drives the compressor 82, along with the prime mover 16, through the turbine drive shaft 36. The turbine 34 expands the pressurised expendable vapour, thereby increasing its velocity and lowering its pressure, and discharges the high velocity low-pressure expendable vapour into a turbine output path 38. At the same time, the turbine 88 receives the cooled high-pressure air from the heat exchanger output path 86 and expands the cooled high-pressure air, thereby lowering its pressure and cooling it still further. The power from the turbine 88 assists the turbine 34 and prime mover 16 in driving the compressor 82. The air turbine then discharges the cold low-pressure air into the low-pressure air supply path 78, thereby completing the cycle.

Vaporising the expendable in the heat exchanger 22 maximises the degree of heat sinking that it can perform whilst driving the turbine 34 with the vaporised expendable assists driving the compressor 82 to minimise the electrical or mechanical shaft power required by the prime mover 16. Thus, the cooling system 74 according to this possible embodiment of the invention provides greater cooling capacity with less input power than heretofore available systems.

Hereinbefore described are possible embodiments for a cooling system with compression cooling cycle for a working fluid, either vapour or air, that passes an expendable fluid through a warm side heat exchanger for the cooling system to cause the expendable fluid to vaporise and thus absorb heat from the working fluid by way of latent heat or enthalpy of vaporisation and then running the vaporised expendable through a turbine that drives a compressor for the cooling system. The described embodiments of the invention are only some illustrative implementations of the invention wherein changes and substitutions of the various parts and arrangement thereof are within the scope of the invention as set forth in the attached claims.

The claimed invention is:

1. A cooling system that uses a compression cycle for cooling a working fluid, comprising:
    a cool side heat exchanger for transferring heat QL from a heat load to the working fluid that heats the working fluid;
    a compressor driven by a prime mover that receives the heated working fluid and compresses it to a high pressure;
    a warm side heat exchanger that receives the heated high-pressure working fluid from the compressor and cools it with an expendable liquid that receives heat from the heated high pressure working fluid and vaporises it to produce a pressurised expendable gas;
    a turbine powered by the pressurised expendable gas that assists the prime mover to drive the compressor;
    an expendable storage tank for storing the expendable; and
    an expendable feed pump for transferring expendable from the expendable storage tank to the warm side heat exchanger.

2. A cooling system that uses a compression cycle for cooling a working fluid, comprising:
    a cool side heat exchanger for transferring heat QL from a heat load to the working fluid that heats the working fluid;
    a compressor driven by a prime mover that receives the heated working fluid and compresses it to a high pressure;
    a warm side heat exchanger that receives the heated high-pressure working fluid from the compressor and cools it with an expendable liquid that receives heat from the heated high pressure working fluid and vaporises it to produce a pressurised expendable gas; and
    a turbine powered by the pressurised expendable gas that assists the prime mover to drive the compressor;
    wherein the expendable is an expendable selected from the group of hydrocarbons comprising propane and butane.

3. A cooling system that uses a compression cycle for cooling a working fluid, comprising:
    a cool side heat exchanger for transferring heat QL from a heat load to the working fluid that heats the working fluid;
    a compressor driven by a prime mover that receives the heated working fluid and compresses it to a high pressure;
    a warm side heat exchanger that receives the heated high-pressure working fluid from the compressor and cools it with an expendable liquid that receives heat from the heated high pressure working fluid and vaporises it to produce a pressurised expendable gas;
    a turbine powered by the pressurised expendable gas that assists the prime mover to drive the compressor;
    an air compressor for compressing air from an air supply to high pressure; and a combustor for receiving the high-pressure air from the air turbine and the pressurised expendable gas from the warm side heat exchanger and combusting them to produce a combustion gas;

wherein the turbine receives the combustion gas to assist the prime mover to drive the compressor.

4. A cooling system that uses a vapour compression cycle for cooling a working fluid, comprising:

a cool side heat exchanger for transferring heat QL from a heat load to the working fluid that heats the working fluid;

a compressor driven by a prime mover that receives the heated working fluid and compresses it to a high pressure;

a warm side heat exchanger that receives the heated high-pressure working fluid from the compressor and cools it with an expendable liquid that receives heat from the heated high pressure working fluid and vaporises it to produce a pressurised expendable gas; and a turbine powered by the pressurised expendable gas that assists the prime mover to drive the compressor;

wherein the working fluid comprises a working fluid that has a suitable latent heat or enthalpy of vaporisation and boiling point within a reasonable pressure range for a target application.

5. A cooling system that uses a compression cycle for cooling a working fluid, comprising:

a cool side heat exchanger for transferring heat QL from a heat load to the working fluid that heats the working fluid;

a compressor driven by a prime mover that receives the heated working fluid and compresses it to a high pressure;

a warm side heat exchanger that receives the heated high-pressure working fluid from the compressor and cools it with an expendable liquid that receives heat from the heated high pressure working fluid and vaporises it to produce a pressurised expendable gas; and a turbine powered by the pressurised expendable gas that assists the prime mover to drive the compressor;

a small flow capacity standby compressor for receiving the heated working fluid from the cool side heat exchanger during standby operation and compressing a sufficient volume of heated working fluid for standby operation to high pressure; and a small flow capacity standby expansion valve for receiving the cooled high-pressure working fluid from the warm side heat exchanger during standby operation and reducing its pressure to supply low-pressure working fluid to the cool side heat exchanger during standby operation.

6. The cooling system of claim 5, further comprising:

a standby compressor flow control valve to prevent flow of high-pressure heated working fluid from the compressor back into the standby compressor during normal operation: and a compressor flow control valve to prevent flow of high pressure heated working fluid from the standby compressor back into the compressor during standby operation.

7. The cooling system of claim 6, wherein the standby compressor flow valve and the compressor flow valve comprise check valves.

8. The cooling system of claim 6, wherein the standby compressor flow valve and the compressor flow valve comprise sequentially operated shut-off valves.

9. The cooling system of claim 5, further comprising:

an expansion valve flow control valve for directing the flow of cooled high-pressure working fluid through the expansion valve during normal operation; and a standby expansion valve flow control valve for directing the flow of cooled high-pressure working fluid through the standby expansion valve during standby operation.

10. The cooling system of claim 9, wherein the expansion valve flow control valve and the standby expansion valve flow control valve comprise sequentially operated shut-off valves.

11. The cooling system of claim 9, wherein the expansion valve flow control valve and the standby expansion valve flow control valve comprise a single two-way valve.

12. The cooling system of claim 5, further comprising a small flow capacity standby heat exchanger for cooling the heated high-pressure working fluid from the standby compressor during standby operation.

13. A cooling system that uses a vapour compression cycle for cooling a working fluid, comprising:

a cool side evaporator for transferring heat QL from a heat load to the working fluid that heats the working fluid to its boiling point and lets the working fluid absorb even more heat due to its enthalpy of vaporisation as it changes state to a vapour;

a compressor driven by a prime mover that receives the vaporised heated working fluid from the cool side evaporator during normal operation and compresses it to a high pressure;

a small flow capacity standby compressor for receiving the vaporised heated working fluid from the cool side evaporator during standby operation and compresses a sufficient volume of heated working fluid for standby operation to high pressure;

a warm side condenser that receives the vaporised heated high-pressure working fluid from the compressor and cools it to below its boiling point to change its state back into a high-pressure liquid with an expendable liquid that receives heat from the vaporised heated high pressure working fluid and vaporises the expendable to produce a pressurised expendable gas;

a turbine powered by the pressurised expendable gas that assists the prime mover to drive the compressor;

an expansion valve for receiving the cooled high-pressure working fluid from the warm side heat exchanger and reducing its pressure to supply low-pressure working fluid to the cool side evaporator during normal operation; and a small flow capacity standby expansion valve for receiving the cooled high-pressure working fluid from the warm side condenser during standby operation and reducing its pressure to supply low-pressure working fluid to the cool side evaporator during standby operation.

14. The cooling system of claim 13, further comprising:

a standby compressor flow control valve to prevent flow of high-pressure heated working fluid from the compressor back into the standby compressor during normal operation: and a compressor flow control valve to prevent flow of high pressure heated working fluid from the standby compressor back into the compressor during standby operation.

15. The cooling system of claim 14, wherein the standby compressor flow valve and the compressor flow valve comprise check valves.

16. The cooling system of claim 14, wherein the standby compressor flow valve and the compressor flow valve comprise sequentially operated shut-off valves.

17. The cooling system of claim 13, further comprising:

an expansion valve flow control valve for directing the flow of cooled high-pressure working fluid through the expansion valve during normal operation; and a standby expansion valve flow control valve for directing the flow of cooled high-pressure working fluid through the standby expansion valve during standby operation.

18. The cooling system of claim 17, wherein the expansion valve flow control valve and the standby expansion valve flow control valve comprise sequentially operated shut-off valves.

19. The cooling system of claim 17, wherein the expansion valve flow control valve and the standby expansion valve flow control valve comprise a single two-way valve.

20. The cooling system of claim 13, further comprising a small flow capacity standby condenser for cooling the vaporised heated high-pressure working fluid from the standby compressor and cools it to below its boiling point to change its state back into a high-pressure liquid during standby operation.

21. The cooling system of claim 13, wherein the working fluid comprises a working fluid that has a suitable latent heat or enthalpy of vaporisation and boiling point within a reasonable pressure range for a target application.

* * * * *